Patented Feb. 18, 1947

2,415,937

UNITED STATES PATENT OFFICE 2,415,937

OXAZOLE COMPOUNDS OF THE ANTHRAQUINONE SERIES

Joseph Deinet, Glassboro, N. J., assignor to E. I. du Pont de Nemours & Company, Wilmington, Del., a corporation of Delaware No Drawing. Application June 6, 1944, Serial No. 539,028

3 Claims. (Cl. 260—307.5)

This invention relates to the preparation of compounds of the anthraquinone series, and more particularly to the preparation of oxazole compounds which dye cotton in desirable brilliant yellow shades of good light fastness and good tinctorial strength and which may also be used as intermediates for the preparation of other dyes.

Although the preparation of oxazole compounds of the anthraquinone series, wherein a monohalogen anthraquinone is condensed with the benzene carboxylic acid, is known, the compounds produced heretofore in this class have limited value as dye intermediates because of their resulting nuclear molecular constitution, and are of no commercial value as vat dyes.

It is therefore an object of the present invention to produce new and valuable dyes and dye intermediates of the anthraquinone series. A further object of the invention is to produce brilliant yellow dyeing vat dyes of the anthraquinone-oxazole series, and to produce compounds which serve as intermediates for the preparation of vat dyes of the anthraquinone-oxazole types.

I have found that new and valuable dyes and intermediates of the oxazole class can be produced by condensing 1-halogen-2-aminoanthraquinones with a dicarboxylic acid chloride of the naphthalene series in which the carboxylic acid groups are attached to the same ring in meta or para positions with reference to each other. These condensation products are then treated with an alkaline agent in an organic solvent to convert them to the oxazoles. Where the 1,3-dihalogen-2-aminoanthraquinones are employed, the oxazole compounds of the anthraquinone series are produced which are valuable for further condensation in the preparation of other dyes, as more particularly described in copending application Serial No. 539,029, filed of even date herewith. The anthraquinone-oxazoles of this invention therefore have the following general formula:

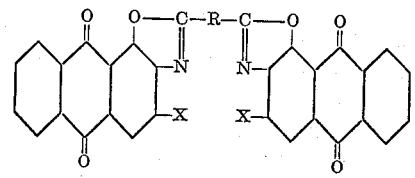

wherein R stands for an aryl radical of the naphthalene series to which the oxazole groups are attached in meta or para position, and in which one or both X stand for hydrogen or halogen.

These new compounds, when they carry halogen in one or both of the 3-positions, are particularly useful in the preparation of new vat colors by further condensation with aminoanthraquinones. The compounds of the above formula are intensely yellow products which, when vatted in the usual alkaline hydrosulfite vat, dye cotton in strong and bright yellow shades of good fastness properties.

The following examples are given to illustrate the invention. The parts used are by weight.

*Example 1*

150 parts of nitrobenzene, 26 parts of naphthalene-1,4-dicarboxylic acid and 44 parts of thionyl chloride are heated together to 130°–133° C. and maintained until the naphthalene-1,4-dicarbonyl chloride is formed. At 110° C., the solution is air blown for 1.5 hours, then further cooled to 25° C., whereupon 450 parts of nitrobenzene and 85 parts of 1,3-dibromo-2-aminoanthraquinone are added. The mixture is heated to 115° C. and maintained for one hour, then heated to 205° C. and maintained for one hour. The reaction mass is cooled to 25° C., filtered, and the cake washed with alcohol and dried.

1200 parts of nitrobenzene, 96 parts of the above condensation product, 48 parts of potassium acetate, 24 parts of sodium carbonate, 0.5 part of cuprous chloride and 0.25 part of copper powder are heated together with agitation to 210° C. and maintained for 3 hours. The reaction mass is cooled to 25° C., filtered, washed with nitrobenzene, alcohol and hot water in turn, and dried.

The product is a yellow powder vattable with sodium hydrosulfite to yield a blue-violet solution from which cotton is dyed in bright yellow shades of good fastness properties. It is believed to have the following formula:

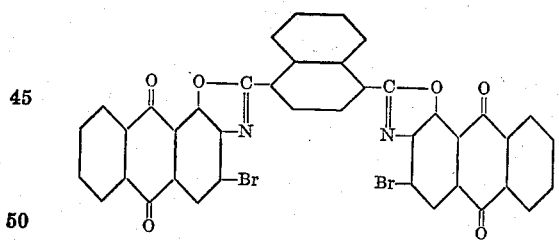

*Example 2*

350 parts of nitrobenzene, 70 parts of naphthalene-1,4-dicarboxylic acid and 116 parts of thionyl chloride are heated together to 130°–135°

C. and maintained until the naphthalene-1,4-dicarboxylic acid chloride is formed. At 110° C. the solution is air blown for one to two hours, then further cooled to 25° C., whereupon 1200 parts of nitrobenzene and 150 parts of 1-chloro-2-amino-anthraquinone are added. The mixture is heated to 115° C. and maintained for one hour, then heated to 205° C. and maintained for one hour. The reaction mass is cooled to 25° C., filtered, washed with alcohol and dried.

1400 parts of nitrobenzene, 92.5 parts of above condensation product, 46 parts of potassium acetate, 23 parts of sodium carbonate and 1 part cuprous chloride are heated together to 208° C. and maintained for 3 hours, cooled to 25° C., filtered, washed with nitrobenzene, alcohol and hot water (in turn) and dried.

The product is a yellow powder, vattable with sodium hydrosulfite to yield a blue-violet solution from which cotton is dyed in strong, bright yellow shades of good fastness properties. It has the following probable formula:

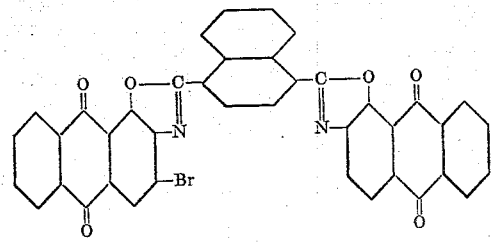

The naphthalene dicarboxylic acids employed in the preparation of these new compounds may also carry simple monovalent substituents such as halogen and methyl groups.

The term "halogen," as used in this case, refers particularly to bromine and chlorine, which are commonly employed in anthraquinone chemistry where replacement or further condensation of the intermediate is contemplated.

I claim:

1. The oxazole compounds of the anthraquinone series having the following general formula:

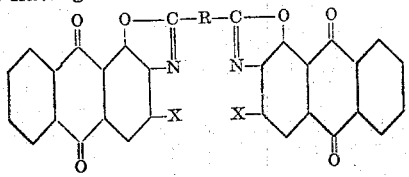

wherein R stands for a radical of the class consisting of the naphthalene, methyl substituted naphthalene and halogen substituted naphthalene radicals to which the oxazole groups are attached in one of the sets of positions meta or para, and wherein X stands for a substituent of the group consisting of hydrogen and halogen of the class consisting of chlorine and bromine.

2. The oxazole compound of the formula:

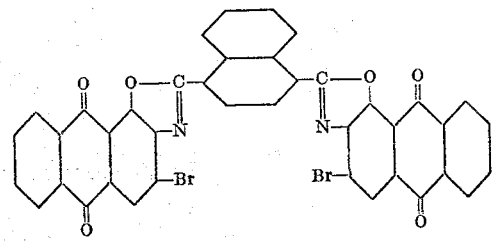

3. The oxazole compound of the formula:

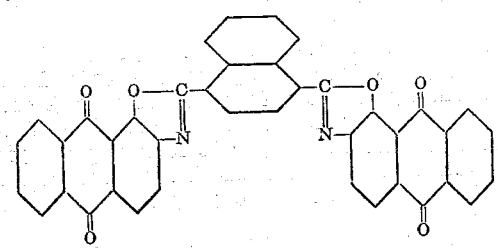

JOSEPH DEINET.

REFERENCES CITED

The following references are of record in the file of this patent:

UNITED STATES PATENTS

| Number | Name | Date |
|---|---|---|
| 2,299,826 | Kern et al. | Oct. 27, 1942 |
| 1,822,972 | Kalischer et al. | Sept. 15, 1938 |
| 2,123,834 | Kranzleer et al. | July 12, 1938 |
| 1,034,895 | Friedmann et al. | Aug. 6, 1912 |
| 2,130,031 | Rintelman | Sept. 13, 1938 |
| 2,206,128 | Schlichting | July 2, 1940 |
| 1,911,714 | Rosch | May 30, 1933 |
| 2,045,304 | Lulek et al. | June 23, 1936 |
| 2,149,064 | Mieg | Feb. 28, 1939 |

FOREIGN PATENTS

| Number | Country | Date |
|---|---|---|
| 651,432 | German | Oct. 13, 1937 |